United States Patent
Kollmann et al.

(10) Patent No.: US 10,406,462 B2
(45) Date of Patent: *Sep. 10, 2019

(54) FILTER DEVICE

(71) Applicant: Mahle International GmbH, Stuttgart (DE)

(72) Inventors: Andreas Kollmann, Eitweg (AT); Stephan Mert, St. Michael (AT); Hannes Ogris, Eberndorf (AT)

(73) Assignee: Mahle International GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,685

(22) Filed: Feb. 7, 2018

(65) Prior Publication Data

US 2018/0161710 A1 Jun. 14, 2018

Related U.S. Application Data

(63) Continuation of application No. 15/568,462, filed as application No. PCT/EP2016/057600 on Apr. 7, 2016, now Pat. No. 10,035,090.

(30) Foreign Application Priority Data

Apr. 21, 2015 (DE) ........................ 10 2015 207 231

(51) Int. Cl.
*B01D 35/30* (2006.01)
*F02M 37/24* (2019.01)
(Continued)

(52) U.S. Cl.
CPC ......... *B01D 35/301* (2013.01); *B01D 35/153* (2013.01); *B01D 35/16* (2013.01);
(Continued)

(58) Field of Classification Search
CPC .... F02M 37/22; F02M 37/221; B01D 35/301; B01D 35/153; B01D 35/16;
(Continued)

(56) References Cited

U.S. PATENT DOCUMENTS 6,217,763 B1 * 4/2001 Lawrence ............. B01D 29/111
 210/232
6,251,273 B1 6/2001 Jawurek et al.

FOREIGN PATENT DOCUMENTS

DE 3903675 A1 8/1990
DE 19707132 A1 8/1998
(Continued)

OTHER PUBLICATIONS

English abstract for DE-3903675.
(Continued)

*Primary Examiner* — Thomas M Lithgow
(74) *Attorney, Agent, or Firm* — Fishman Stewart PLLC

(57) ABSTRACT

A filter device may include a filter housing with a filter housing pot and a cover screwable onto the filter housing pot, and an annular filter element arranged in the filter housing. The annular filter element may be connected to the cover via a first thread, which may have a dome protruding centrally and axially from an upper end disc of the annular filter element, with an outer thread interrupted by free passages, and hollow cylindrical spring elements, which may protrude axially from the cover and on which an inner thread portion designed to complement the outer thread may be arranged. Each inner thread portion may extend over a longer circumferential portion than one of the free passages. The first thread may be designed running counter to a second thread arranged between the filter housing pot and the cover.

20 Claims, 2 Drawing Sheets

(51) Int. Cl.
   *B01D 35/153* (2006.01)
   *B01D 35/16* (2006.01)
   *F02M 37/22* (2019.01)
   *B01D 27/08* (2006.01)

(52) U.S. Cl.
   CPC ......... *B01D 35/306* (2013.01); *F02M 37/22* (2013.01); *F02M 37/24* (2019.01); *B01D 27/08* (2013.01); *B01D 35/30* (2013.01); *B01D 2201/291* (2013.01); *B01D 2201/305* (2013.01); *B01D 2201/306* (2013.01); *B01D 2201/4007* (2013.01); *B01D 2201/4015* (2013.01); *B01D 2201/4076* (2013.01); *B01D 2201/4084* (2013.01); *B01D 2201/4092* (2013.01)

(58) Field of Classification Search
   CPC ...... B01D 35/306; B01D 27/08; B01D 35/30; B01D 2201/291; B01D 2201/305; B01D 2201/4007; B01D 2201/4092; B01D 2201/306; B01D 2201/4015; B01D 2201/4076; B01D 2201/4084

USPC ....................................................... 210/454
See application file for complete search history.

(56) References Cited

FOREIGN PATENT DOCUMENTS

| | | |
|---|---|---|
| DE | 19904981 A1 | 8/2000 |
| DE | 102008011616 A1 | 9/2008 |
| DE | 102009024699 A1 | 12/2010 |
| DE | 102012000876 C5 | 10/2014 |
| WO | WO-0110533 A1 | 2/2001 |
| WO | WO-2005123216 A1 | 12/2005 |

OTHER PUBLICATIONS

English abstract for DE-102009024699.
English abstract for DE-102008011616.
English abstract for DE-19904981.
English abstract for DE-102012000876.

\* cited by examiner

FILTER DEVICE

CROSS-REFERENCE TO RELATED APPLICATIONS

This application is a continuation of U.S. patent application Ser. No. 15/568,462, filed Oct. 20, 2017, which claims priority to International Patent Application No. PCT/EP2016/057600, filed on Apr. 7, 2016, and German Patent Application No. DE 10 2015 207 231.2, filed on Apr. 21, 2015, the contents of all of which are incorporated herein by reference in their entireties.

TECHNICAL FIELD

The present invention relates to a filter device having a housing with a filter housing pot and with a cover that can be screwed onto the latter. The invention relates furthermore to an annular filter element for such a filter device.

BACKGROUND

Generic filter devices are sufficiently and diversely known.

From DE 197 07 132 A1 a filter device having a housing with a filter housing pot and with a cover that can be screwed onto the latter, and with an annular filter element arranged therein is known, wherein at least one snap-on means is provided, by means of which a detachable snap-on connection is able to be produced between the filter element and at least one of the housing parts. Hereby it is to be made possible in particular to mount or respectively to dismantle a filter element more simply without, in so doing, having to come in direct contact with the filter element.

From DE 10 2012 00 876 C5 a liquid filter of an internal combustion engine with a filter housing is known, which is connected to a liquid duct system. A housing pot is connected here to a housing cover via a housing/cover connection, wherein this connection can be locked and unlocked by means of a housing rotational movement of the housing pot relative to the housing cover about an imaginary mounting axis. A filter element is connected to the housing cover via an element/cover connection. The two connections are coordinated to one another here such that on a rotary movement of the housing pot relative to the housing cover for opening or closing the connection there, this rotary movement is transferred to the filter element by means of the element/housing connection, so that the filter element can be rotated jointly with the housing pot relative to the housing cover. As the closing direction of the housing/cover connection corresponds to the opening direction of the element/cover connection, the element/cover connection can be unlocked automatically on locking of the housing/cover connection, in so far as said element/cover connection was previously locked. Hereby in particular also a resource-conserving filter element exchange is to be made possible.

From DE 10 2008 011 616 A1 a filter housing is known, which extends along a longitudinal axis and comprises two housing parts which are detachably connected to one another. The connection of the two housing parts is detachable by rotation of the one housing part in a rotation direction about the longitudinal axis relative to the other housing part. Furthermore, an anti-rotations means for the two housing parts with respect to one another is provided, with an actuating lever, which together with its lever axis is embodied in one piece and in a materially integral manner with a wall of one of the two housing parts. Hereby, it is to be possible to mount or respectively dismantle the cover more easily.

In fuel- or respectively lubricant filter systems, in particular in the case of large annular filter elements, such as for example in utility vehicle filters, intensive friction forces occur between sealing rings and sealing surfaces. By the expanding of the sealing rings during the operation of the filter systems, these forces can be additionally intensified. Hereby, during servicing, it can occur that the conventional holding forces of a clip connection between a cover and the annular filter element are not sufficient to also draw the latter out from the filter housing pot on loosening of the cover, so that it remains therein and must be removed therefrom laboriously.

SUMMARY

The present invention is therefore concerned with the problem of indicating for a filter device of the generic type an improved or at least an alternative embodiment, which in particular is easier to maintain.

This problem solved according to the invention by the subject of the independent claims. Advantageous embodiments are the subject of the dependent claims.

The present invention is based on the general idea of using a new connection between a cover of a housing of a filter device and an annular filter element, which can transfer sufficient force during servicing in order to be able to draw the annular filter element out from a filter housing pot and namely even if seals have expanded after a lengthy operation and therefore increased removal forces are necessary. The filter device according to the invention has here a housing with a filter housing pot and a cover that can be screwed onto it, and an annular filter element, arranged in the housing, with a pin protruding axially from a lower disc for closing a run-off channel. The annular filter element itself is connected to the cover via a first thread, wherein this first thread comprises a dome protruding centrally and axially from an upper end disc of the annular filter element, with an outer thread interrupted by free passages, and hollow cylindrical spring elements protruding axially on the cover, wherein on the spring elements respectively an inner thread portion is arranged respectively, designed to complement the outer thread. Each of these inner thread portions extends here over a longer circumferential portion than one of the free passages. Furthermore, the first thread is designed running counter to a second thread arranged between the filter housing pot and the cover. With the thread configured according to the invention between the cover and the annular filter element, it is particularly easy to also mount or respectively dismantle comparatively large annular filter elements, for example in utility vehicles. On mounting, firstly here the annular filter element is screwed in the cover, wherein this screwing is possible with few rotational movements owing to the free passages provided in the outer thread of the annular filter element. Subsequently, the thus pre-mounted assembly can be screwed to the filter housing pot, wherein for example a carrier geometry, arranged on a face side of the dome, cooperates with a counter-carrier geometry on the cover side, such that the annular filter element during mounting of the cover, i.e. during screwing onto the filter housing pot, co-rotates until the pin engages into the run-off channel. Starting from this moment in time, the annular filter element is prevented from a further rotational movement and is pressed by the cover further downward into the filter housing pot, until the second thread is completely screwed tightly and the pin engages completely and in a sealed manner into the run-off channel.

A dismantling of the cover together with the annular filter element takes place now such that the cover is unscrewed from the filter housing pot in the usual manner, wherein the annular filter element remains initially with its pin in the run-off channel and thereby does not co-rotate with the cover. Through the thread pitches, configured in a wedge-shaped manner, both on the inner thread portion and also on the outer thread the annular filter element can now be drawn up owing to the oppositely directed inclination of the first thread relative to the second thread and thereby the pin can be drawn out from the run-off channel.

Alternatively, of course also firstly the annular filter element can be inserted into the filter housing pot and subsequently the cover can be screwed on. Here, likewise, the inner thread portions slide over their sliding inclinations along the sliding inclinations of the outer thread, wherein a correct positioning of the pin relative to the run-off channel is now not achieved exclusively via the carrier geometry, but in addition also via the inner thread portions of the spring elements. After the engaging of the pin into the run-off channel, through the configuration of the first thread according to the invention and in particular of the spring elements protruding axially on the cover and arranged in a hollow cylindrical manner, it can be achieved that the latter slide over the thread pitches of the outer thread on the annular filter element, for which both on the outer thread and also on the inner thread portions of the spring elements sliding inclinations are arranged. Via these sliding inclinations/sliding surfaces, the respective inner thread portion of a spring element is moved until it is guided over the outer thread and snaps back inwards again elastically and thereby engages behind the outer thread on the dome of the annular filter element.

It is particularly advantageous in the filter device according to the invention that a mounting of the annular filter element in the filter device irrespective of the two alternatives is possible comparatively simply and without greater expenditure of force. In the same way, a dismantling of the annular filter element also proves to be simple, because the inner thread portions are able to transfer high forces to the annular filter element in axial direction.

In a further advantageous embodiment of the solution according to the invention, a total of eight spring elements are provided with respectively one inner thread portion. Additionally or alternatively, the outer thread can have a total of six free passages. This special embodiment of the outer thread and of the inner thread portion makes possible both a reliable and simple mounting and also, in the same way, a reliable and simple dismantling, in which in any case it can be ensured that even in the case of expanded seals and thereby high holding forces between the annular filter element and the filter housing pot, the annular filter element can be drawn out reliably from the filter housing pot.

Expediently, the dome and the outer thread with its free passages are formed in one piece with the upper end disc. Here, it suggests itself to form the upper end disc together with dome and with the outer thread as a favourably priced plastic injection-moulded part, wherein of course in the same manner also the lower end disc together with the pin can be formed as a favourably priced, one-piece plastic injection-moulded part.

The present invention is further based on the general idea of indicating an annular filter element for such a previously described filter device, with a pin protruding axially from a lower end disc for closing a run-off channel and with a dome protruding axially centrally from an upper end disc with an outer thread interrupted by free passages. Through the special configuration of the inner thread portion and of the outer thread, a type of key/lock principle can also be realized, which enforces the use of an authorized annular filter element, whereby in particular a long-term first class filter performance can be guaranteed.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown here, respectively diagrammatically.

DETAILED DESCRIPTION

Figure 1:
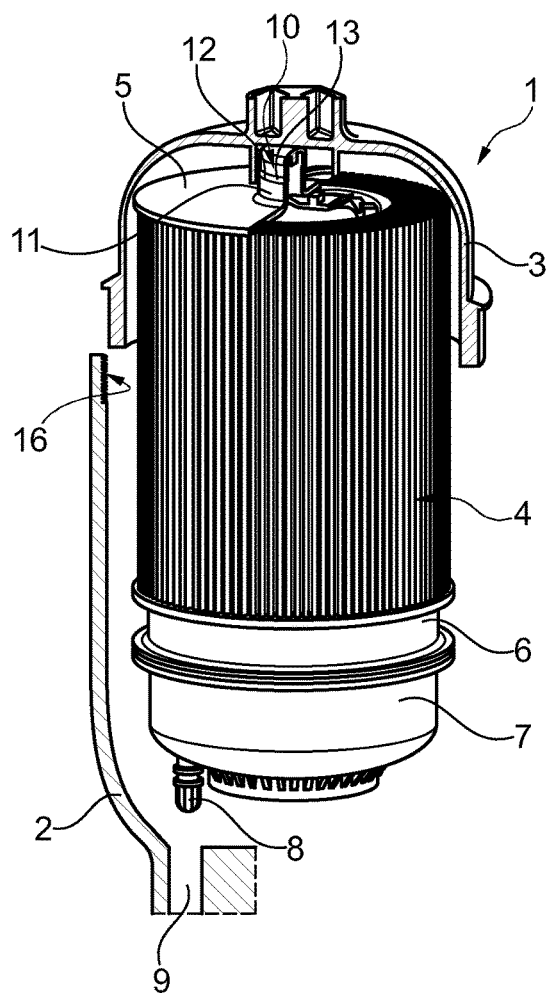
FIG. 1 a view, partially in section, onto a filter device according to the invention, FIG. 2 a detail illustration from the region of a first thread, FIG. 3 a view, likewise partially in section, of the filter device, FIG. 4 a sectional illustration through the filter device in the region of the first thread, FIG. 5 on the left a view onto the first thread, on the right an illustration as on the left, but without annular filter element.
Figure 2:
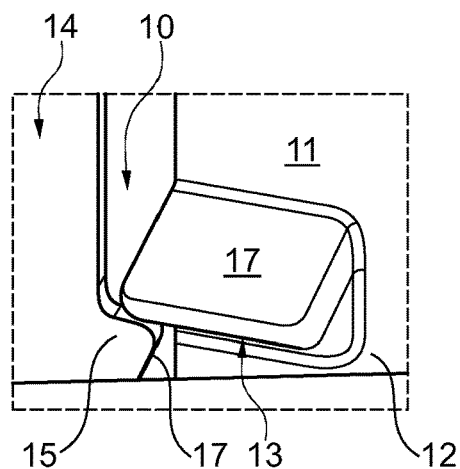
Figure 3:
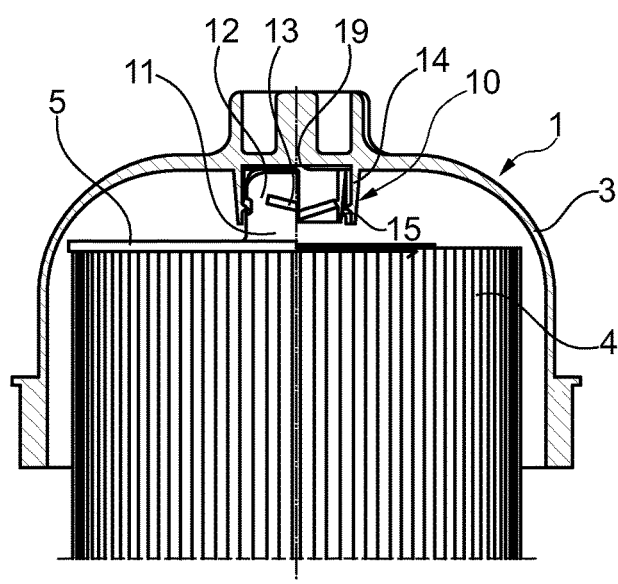

According to FIG. 1, a filter device 1 according to the invention, which can be constructed for example as a fuel- or as a lubricant filter in a utility vehicle, has a filter housing pot 2 and a cover 3 which can be screwed onto it (cf. also FIGS. 3 and 4), and an annular filter element 4 arranged therein. The annular filter element 4 has an upper end disc 5 and a lower end disc 6, wherein on the lower end disc 6 a water collecting space 7 with an axially protruding pin 8 is arranged. The latter engages, when the filter device 1 is installed, into a run-off channel 9 and closes the latter. According to the invention, the annular filter element 4 is connected to the cover 3 via a first thread 10. The first thread 10 is formed here by a dome 11 protruding centrally axially from the upper end disc 5 of the annular filter element 4 (cf. also FIGS. 2 to 5) with an outer thread 13, interrupted by free passages 12, and spring elements 14 protruding axially on the cover 3 and arranged hollow-cylindrically, on which respectively an inner thread portion 15 designed to complement the outer thread 13 is arranged. Here, each of the inner thread portions 15 extends over a longer circumferential portion, i.e. over a longer circular segment portion, than a free passage 12. Furthermore, the first thread 10 is designed running counter to a second thread 16 arranged between the filter housing pot 2 and the cover 3.

Observing both the outer thread 13 and also the associated inner thread portions 15, it can be seen that these are formed in a wedge-shaped manner and respectively have a sliding surface 17, the significance of which will be described further below. Owing to their at least slight radial elasticity, the spring elements 14 also make possible an inserting of the annular filter element 4 into the cover 3, at which the outer thread 13 moves over its sliding surface 17 the associated inner thread portion 15 outwards over its sliding surface 17, until the outer thread 13 engages behind the inner thread portion 15 and thereby the spring element 14 springs back radially inwards.

Here, at least two spring elements 14 and two free passages 12 are provided. Preferably, a total of eight spring elements 14 are provided with respectively an inner thread portion 15. Furthermore, the outer thread 13 has a total of six free passages 12. This offers the particular advantage of making possible a simple mounting of the annular filter element 4 in the filter device 1 and likewise also a reliable dismantling thereof.

The dome 11 and the outer thread 13 with its free passages 12 are preferably formed here in one piece with the upper end disc 5, so that the latter can be produced as a plastic injection-moulded part in a single manufacturing step in a simple manner as regards production and at a favourable cost. The first thread 10 is formed here preferably as a left-hand thread, whereas the second thread 16 is then formed as a right-hand thread. Of course, a reverse embodiment is also conceivable.

Figure 4:
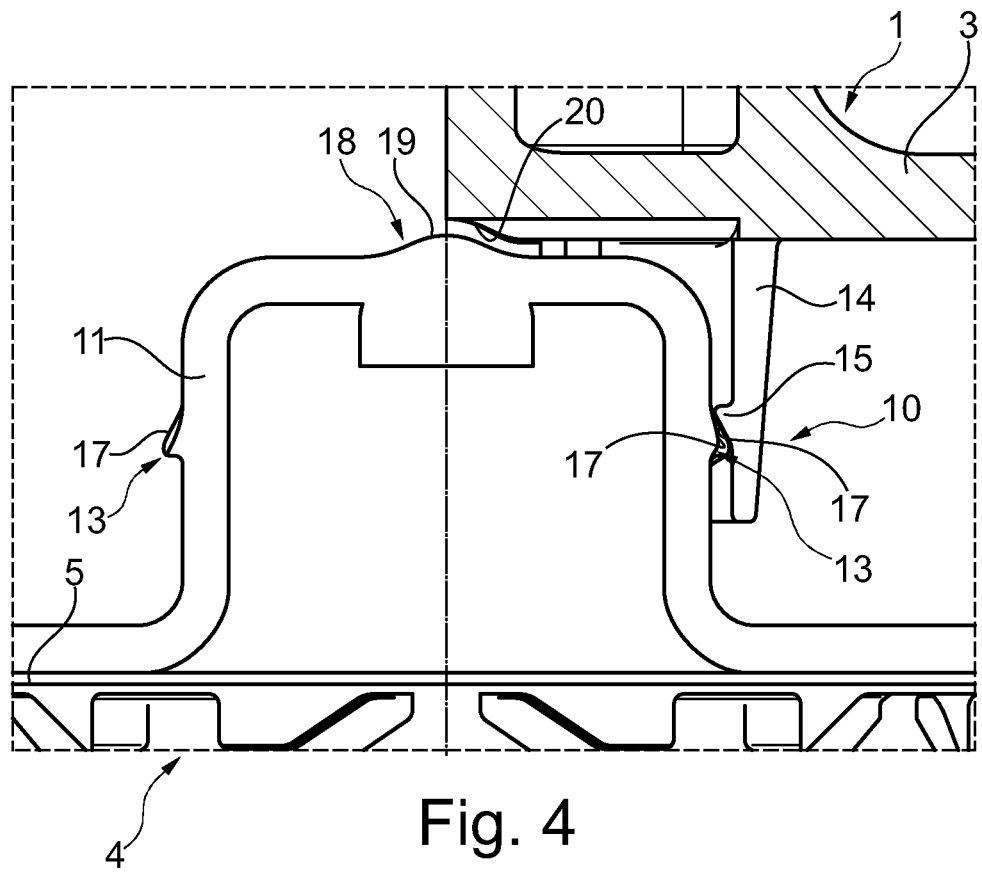
Figure 5:
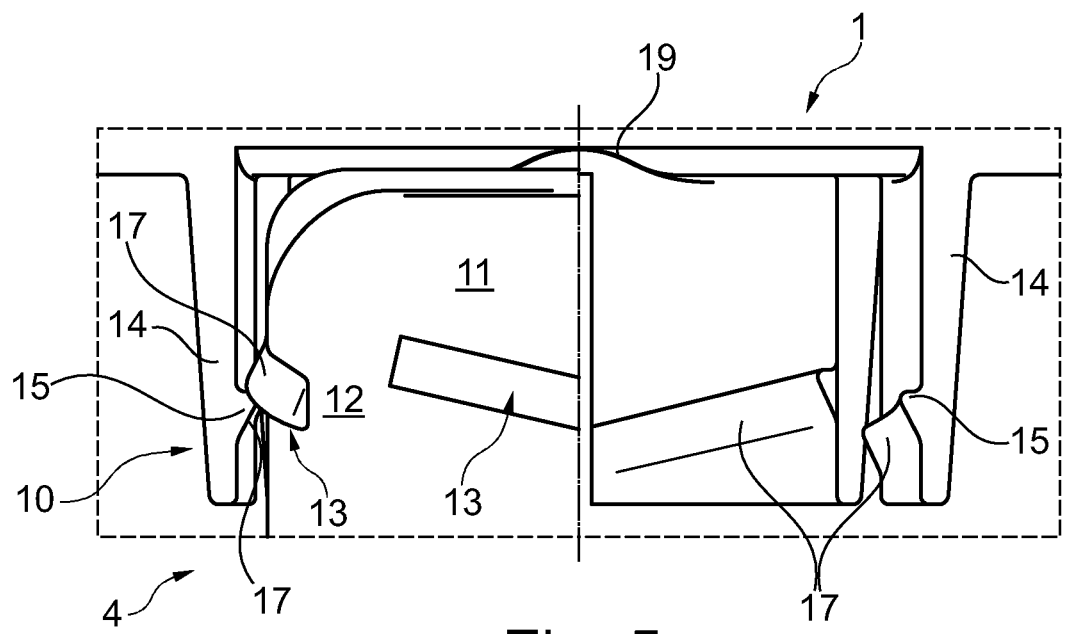

Observing FIGS. 4 and 5, it can be seen that on a face side 18 of the dome 11 a carrier geometry 19 is arranged, which cooperates with a counter-carrier geometry 20 arranged on the cover 3 such that the annular filter element 4, on mounting of the cover 3, is co-rotated until the pin 8 engages into the run-off channel 9.

The mounting of the annular filter element 4 in the filter device 1 is generally configured as follows:

Firstly, the annular filter element 4 with its dome 11 can be screwed to the cover 3 via the first thread 3, which owing to the free passages 12 is possible with little expenditure of force and small rotational movements. Subsequently, the assembly which is pre-mounted in such a manner is inserted into the filter housing pot 2 and in so doing the cover 3 is screwed to the filter housing pot 2. As the first thread 10 is designed running counter to the second thread 16, firstly a co-rotating of the annular filter element 4 takes place via the carrier geometry 19 and the counter-carrier geometry 20, until said annular filter element engages with its pin 8 into the run-off channel 9. Starting from this moment in time, only the cover 3 is twisted into the final position. With a further screwing-on of the cover 3, the inner thread portions 15 can now slide over their sliding surfaces 17 of the outer thread 13 and can be moved radially outwards until the inner thread portions 15 engage behind the outer thread 13 again and the spring elements 14 spring back radially inwards.

Alternatively to this mounting process, of course also firstly the annular filter element 4 can be positioned in the filter housing pot 2 and the cover 3 can only be subsequently screwed on. The correct position of the pin 8 is achieved here not only via the carrier geometry 19 but also via the geometry of the inner thread portions 15 and of the outer thread 13. With a further screwing on of the cover 3, the inner thread portions 15 can now slide over their sliding surfaces 17 of the outer thread 13 and be moved radially outwards, until the inner thread portions 15 engage behind the outer thread 13 again and the spring elements 14 spring back radially inwards.

A dismantling of the annular filter element 4 from the filter device 1 takes place by a simple unscrewing of the cover 3, wherein through the first thread 11 oppositely directed to the second thread 16 a drawing up of the annular filter element 4 and thereby a drawing out of the pin 8 from the run-off channel 9 is brought about. Through the wedge-shaped geometry both of the outer thread 13 and also of the inner thread portions 15, these two thread portions interlock and enable a reliable and nevertheless low-force drawing out of the annular filter element 4.

In order to be able to guarantee a long-lasting and high-quality filter performance, the carrier geometry 19 and the counter-carrier geometry 20 and also the outer thread 13 and the inner thread portions 15 of the spring elements 14 cooperate in the manner of a key/lock principle, so that exclusively annular filter elements 4 with matching carrier geometry 19 and matching outer thread 13 can be connected to the cover 3 and inserted into the filter device 1.

The invention claimed is:

1. A filter device comprising:
   a filter housing with a filter housing pot and a cover screwable onto the filter housing pot; and
   an annular filter element arranged in the filter housing wherein the annular filter element is connected to the cover via a first thread;
   wherein the first thread has a dome protruding centrally and axially from an upper end disc of the annular filter element, with an outer thread interrupted by free passages, and hollow cylindrical spring elements which protrude axially from the cover and on which an inner thread portion designed to complement the outer thread is arranged;
   wherein each inner thread portion extends over a longer circumferential portion than one of the free passages;
   wherein the first thread is designed running counter to a second thread arranged between the filter housing pot and the cover.

2. The filter device according to claim 1, wherein a total of eight spring elements are provided with the inner thread portion.

3. The filter device according to claim 1, wherein the outer thread has a total of six free passages.

4. The filter device according to claim 1, wherein the dome and the outer thread with the free passages are formed in one piece with the upper end disc.

5. The filter device according to claim 1, wherein the first thread is formed as a left-hand thread and the second thread as a right-hand thread.

6. The filter device according to claim 1, wherein on a face side of the dome a carrier geometry is arranged, which cooperates with a counter-carrier geometry on a cover side such that the annular filter element on mounting of the cover co-rotates.

7. The filter device according to claim 1, wherein the filter device is constructed as one of a fuel filter or a lubricant filter.

8. An annular filter element for a filter device, comprising:
   a dome protruding centrally and axially from an upper end disc with an outer thread interrupted by free passages.

9. The annular filter element according to claim 8, wherein the outer thread has at least two free passages.

10. The annular filter element according to claim 8, wherein the dome and the outer thread with the free passages are formed in one piece with the upper end disc.

11. The annular filter element according to claim 9, wherein the outer thread has six free passages.

12. The filter device according to claim 1, wherein the dome and the outer thread with the free passages are formed in one piece with the upper end disc.

13. The filter device according to claim 12, wherein the first thread is formed as a left-hand thread and the second thread as a right-hand thread.

14. The filter device according to claim 12, wherein on a face side of the dome a carrier geometry is arranged, which cooperates with a counter-carrier geometry on a cover side such that the annular filter element on mounting of the cover co-rotates.

15. The filter device according to claim 12, wherein the filter device is constructed as one of a fuel filter or a lubricant filter.

16. A filter device comprising:
   a filter housing with a filter housing pot and a cover screwable onto the filter housing pot; and
   an annular filter element arranged in the filter housing;
   wherein the annular filter element is connected to the cover via a first thread;
   wherein the first thread has a dome protruding centrally and axially from an upper end disc of the annular filter element, with an outer thread interrupted by free passages, and hollow cylindrical spring elements which protrude axially from the cover and on which an inner thread portion designed to complement the outer thread is arranged;
   wherein each inner thread portion extends over a longer circumferential portion than one of the free passages;
   wherein the first thread is designed running counter to a second thread arranged between the filter housing pot and the cover;
   wherein on a face side of the dome a carrier geometry is arranged, which cooperates with a counter-carrier geometry on a cover side such that the annular filter element on mounting of the cover co-rotates.

17. The filter device according to claim 16, wherein a total of eight spring elements are provided with the inner thread portion.

18. The filter device according to claim 16, wherein the outer thread has a total of six free passages.

19. The filter device according to claim 16, wherein the dome and the outer thread with the free passages are formed in one piece with the upper end disc.

20. The filter device according to claim 16, wherein the first thread is formed as a left-hand thread and the second thread as a right-hand thread.

* * * * *